United States Patent Office

Re. 28,240
Reissued Nov. 12, 1974

28,240

PHOTOSENSITIVE ELEMENTS CONTAINING PHOTOOXIDANTS CONTAINING HETEROCYCLIC NITROGEN ATOM SUBSTITUTED BY AN ALKOXY OR AN ACYLOXY GROUP

Philip W. Jenkins, Rochester, N.Y., assignor to Eastman Kodak Company, Rochester, N.Y.

No Drawing. Original No. 3,615,568, dated Oct. 26, 1971, Ser. No. 859,205, Sept. 18, 1969. Application for reissue Sept. 10, 1973, Ser. No. 396,290
Int. Cl. G03c *1/40, 1/64*
U.S. Cl. 96—90 R 15 Claims

Matter enclosed in heavy brackets [ ] appears in the original patent but forms no part of this reissue specification; matter printed in italics indicates the additions made by reissue.

ABSTRACT OF THE DISCLOSURE

Novel photosensitive elements and compositions are described. The compositions contain (a) a colorless oxidizable nitrogen-containing organic color generator and (b) a photooxidant containing a heterocyclic nitrogen atom which is substituted by an alkoxy or an acyloxy group. When the photooxidant is exposed to actinic radiation, it causes the oxidation of the color generator to a colored material.

This invention relates to novel photosensitive elements which form an intense color when exposed to actinic radiation and also to novel processes utilizing these elements as well as to novel photosensitive compositions.

The formation of images utilizing dye printout techniques has recently received considerable attention. Processes have been described wherein various leuco compounds have been oxidized to the corresponding leuco dyes utilizing organic polyhalogen compounds or oxidizing agents (Phot. Sci. Eng., 598–103 (1961); U.S. Pat. No. 3,042,515). In a typical process of this type, a mixture of diphenylmethane and carbon tetrabromide is exposed to a pattern of ultraviolet radiation. The radiation causes the halohydrocarbon to decompose. The decomposition products oxidize the diphenylmethane to the corresponding blue dye.

While the above-described system is very practical, it does have several disadvantages. The use of halohydrocarbons as the photo-oxidant is undesirable since these materials generally do not have panchromatic sensitivity but instead are only sensitive in the ultraviolet and near ultraviolet regions. Furthermore, these materials have poor film shelf life because of their volatility and/or thermal instability. Also, they are not readily removable for purposes of image fixation.

It is, therefore, an object of this invention to provide novel photosensitive compositions.

It is a further object of this invention to provide novel elements containing these compositions.

It is a further object of this invention to provide a novel process utilizing these elements.

These and other objects are accomplished with photosensitive elements containing a composition having (a) an essentially colorless oxidizable nitrogen-containing organic color generator which is stable to oxidation by atmospheric oxygen under normal room and storage conditions, but which is oxidizable to a colored material and (b) a photo-oxidant containing a heterocyclic nitrogen atom which is substituted by either an alkoxy group or an acyloxy group. When this element is struck by actinic radiation (e.g., visible, infrared, ultraviolet, X-ray, etc., including an electron beam), the photo-oxidant decomposes to produce an oxidizing agent. The oxidizing agent causes oxidation of the color generator which results in this material's transposition from an essentially colorless condition to a condition of high coloration. The particular color obtained is dependent upon the nature of the color generator, but practically any color can be obtained using various combinations of color generators.

The properties of the photo-oxidant are such that it is easily stabilized against further decomposition by treating it with an acid or a base at a pH that has no effect on the photo-oxidant.

An advantage of the present invention over prior art systems is that the various photo-oxidants are responsive to various forms of actinic radiation as explained previously, whereas prior art systems are generally limited to response to radiation in the ultraviolet region. Also, the photo-oxidants of this invention are less volatile than the halohydrocarbons which are conventionally used as photo-oxidants. As such, the film shelf life is improved. A third advantage is that the photooxidants used in the present invention are easily deactivated by treatment with either an acid or base depending on the particular photo-oxidant used.

The novel compositions and elements of this invention have several uses. One of these uses is in printing where a paper is impregnated with the photosensitive composition and then imagewise exposed to the pattern being printed. Other uses include pattern layout for metal working, preparation of blueprints in a diazo process and in microfilming. The materials of the invention are especially useful in microfilming since the resolution obtainable is very good. High resolutions are obtainable since the active particles are of molecular size (i.e., 1°–35 A. for color generator molecules vs. 500° A. for very fine-grain silver halide particles).

Many types of organic compounds function as organic color generators according to the invention. All are characterized as being essentially colorless, containing nitrogen, being stable to oxidation under normal storage conditions in the photosensitive composition and being capable of producing a color in a photo-oxidative process in the presence of a photo-oxidant. The process may be a simple oxidation of the colorless compound to a colored species. The oxidation may initially produce a reactive intermediate which then undergoes a further reaction with a second component of the color generator to produce the final colored species. In some cases, the reactive intermediate combines with the photo-oxidant to produce a color species. Mixtures of color generators may be used. These color generation processes, and the compounds which are adapted for them, are discussed in detail below.

Useful color generators of this invention include the following:

I. Leuco form of dyes—One type of color generator which may form part of the light-sensitive composition is the reduced form of the dye having, in most cases, one or two hydrogen atoms, the removal of which together with one or two electrons produces a dye. Since leuco form of the dye is essentially colorless, or in some instances it may be of a different color or of a less intense shade than the parent dye, it provides a means of producing an image when the leuco form is oxidized to the dye. This oxidation is accomplished by subjecting an intimate admixture of the organic color generator and a photo-oxidant discussed below to a pattern of actinic radiation. The result is the removal of one or two readily removable hydrogen atoms, depending on the structure of the leuco form of the particular dye chosen, with the production of a colored image against a background of unradiated and, therefore, unchanged material. Representative dyes in the leuco form which are operative according to the invention include:

a. Aminotriarylmethanes bis(4-amino-2-butylphenyl)(p-dimethylaminophenyl) methane bis(4-amino-2-chlorophenyl)(p-aminophenyl)methane
bis(4-amino-3-chlorophenyl)(o-chlorophenyl)methane
bis(4-amino-3-chlorophenyl)phenylmethane
bis(4-amino-3,5-diethylphenyl)(o-chlorophenyl)methane
bis(4-amino-3,5-diethylphenyl)(o-ethoxyphenyl)methane
bis(4-amino-3,5-diethylphenyl)(p-methoxyphenyl) methane
bis(4-amino-3,5-diethylphenyl)phenylmethane
bis(4-amino-ethylphenyl)(o-chlorophenyl)methane
bis(p-aminophenyl)(4-amino-m-tolyl)methane
bis(p-aminophenyl)(o-chlorophenyl)methane
bis(p-aminophenyl)(p-chlorophenyl)methane
bis(p-aminophenyl)(2,4-dichlorophenyl)methane
bis(p-aminophenyl)(2,5-dichlorophenyl)methane
bis(p-aminophenyl)(2,6-dichlorophenyl)methane
bis(p-aminophenyl)phenylmethane 9-methylacridine
bis(4-amino-tolyl)(p-chlorophenyl)methane
bis(4-amino-o-tolyl)(2,4-dichlorophenyl)methane
bis(p-anilinophenyl)(4-amino-m-tolyl)methane
bis(4-benzylamino-2-cyanophenyl)(p-aminophenyl) methane
bis(p-benzylethylaminophenyl)(p-chlorophenyl)methane
bis(p-benzylethylaminophenyl)(p-diethylaminophenyl) methane
(p-diethylaminophenyl)methane
bis(p-benzylethylaminophenyl)(p-dimethylaminophenyl) methane
bis(4-benzylethylamino-o-tolyl)(p-methoxyphenyl) methane
bis(p-benzylethylaminophenyl)phenylmethane
bis(4-benzylethylamino-o-tolyl)(o-chlorophenyl)methane
bis(4-benzylethylamino-o-tolyl)(p-diethylaminophenyl) methane
bis(4-benzylethylamino-o-tolyl)(4-diethylamino-o-tolyl) methane
bis(4-benzylethylamino-o-tolyl)(p-dimethylaminophenyl) methane
bis[2-chloro-4-(2-diethylaminoethyl)ethylaminophenyl] (o-chlorophenyl)methane
bis[p-bis(2-cyanoethyl)aminophenyl]phenylmethane
bis[p-(2-cyanoethyl)ethylamino-o-tolyl](p-dimethyl-aminophenyl)methane
bis[p-(2-cyanoethyl)methylaminophenyl](p-diethyl-aminophenyl)methane
bis(p-dibutylaminophenyl)[p-(2-cyanoethyl)methyl-aminophenyl]methane
bis(p-dibutylaminophenyl)(p-diethylaminophenyl) methane
bis(4-diethylamino-2-butoxyphenyl)(p-diethylamino-phenyl)methane
bis(4-diethylamino-2-fluorophenyl)o-tolylmethane
bis(p-diethylaminophenyl)(p-aminophenyl)methane
bis(p-diethylaminophenyl)(4-anilino-1-naphthyl)methane
bis(p-diethylaminophenyl)(m-butoxyphenyl)methane
bis(p-diethylaminophenyl)(o-chlorophenyl)methane
(p-diethylaminophenyl)(p-cyanophenyl)methane
bis(p-diethylaminophenyl)(o-chlorophenyl)methane
bis(p-diethylaminophenyl)(p-cyanophenyl)methane
bis(p-diethylaminophenyl)(2,4-dichlorophenyl)methane
bis(p-diethylaminophenyl)(4-diethylamino-1-naphthyl) methane
bis(p-diethylaminophenyl)(p-dimethylaminophenyl) methane
bis(p-diethylaminophenyl)(4-ethylamino-1-naphthyl) methane
bis(p-diethylaminophenyl)2-naphthylmethane
bis(p-diethylaminophenyl)(p-nitrophenyl)methane
bis(p-diethylaminophenyl)2-pyridylmethane
bis(p-diethylamino-m-tolyl)(p-diethylaminophenyl) methane
bis(4-diethylamino-o-tolyl)(o-chlorophenyl)methane
bis(4-diethylamino-o-tolyl)(p-diethylaminophenyl) methane
bis(4-diethylamino-o-tolyl)(p-diphenylaminophenyl) methane bis(4-diethylamino-o-tolyl)phenylmethane
bis(4-dimethylamino-2-bromophenyl)phenylmethane
bis(p-dimethylaminophenyl)(4-anilino-1-naphthyl) methane
bis(p-dimethylaminophenyl)(p-butylaminophenyl) methane
bis(p-dimethylaminophenyl)(p-sec. butylethylamino-phenyl)methane
bis(p-dimethylaminophenyl)(p-chlorophenyl)methane
bis(p-dimethylaminophenyl)(p-diethylaminophenyl) methane
bis(p-dimethylaminophenyl)(4-dimethylamino-1-naphthyl)methane
bis(p-dimethylaminophenyl)(6-dimethylamino-m-tolyl) methane
bis(p-dimethylaminophenyl)(4-dimethylamino-o-tolyl) methane
bis(p-dimethylaminophenyl)(4-ethylamino-1-naphthyl) methane
bis(p-dimethylaminophenyl)(p-hexyloxyphenyl)methane
bis(p-dimethylaminophenyl)(p-methoxyphenyl)methane
bis(p-dimethylaminophenyl)(5-methyl-2-pyridyl)methane
bis(p-dimethylaminophenyl)2-quinolylmethane
bis(p-dimethylaminophenyl)o-tolylmethane
bis(p-dimethylaminophenyl)(1,3,3-trimethyl-2-indolinyl-idenemethyl)methane
bis(4-dimethylamino-o-tolyl)(p-aminophenyl)methane
bis(4-dimethylamino-o-tolyl)(o-bromophenyl)methane
bis(4-dimethylamino-o-tolyl)(o-cyanophenyl)methane
bis(4-dimethylamino-o-tolyl)(o-fluorophenyl)methane
bis(4-dimethylamino-o-tolyl)1-naphthylmethane
bis(4-dimethylamino-o-tolyl)phenylmethane
bis(p-ethylaminophenyl)(o-chlorophenyl)methane
bis(4-ethylamino-m-tolyl)(o-methoxyphenyl)methane
bis(4-ethylamino-m-tolyl)(p-methoxyphenyl)methane
bis(4-ethylamino-m-tolyl)(p-dimethylaminophenyl) methane
bis(4-ethylamino-m-tolyl)(p-hydroxyphenyl)methane
bis[4-ethyl(2-hydroxyethyl)amino-m-tolyl](p-diethyl-aminophenyl)methane
bis[p-(2-hydroxyethyl)aminophenyl](o-chlorophenyl) methane
bis[p-bis(2-hydroxyethyl)aminophenyl](4-diethylamino-o-tolyl)methane
bis[p-(2-methoxyethyl)aminophenyl]phenylmethane
bis(p-methylaminophenyl)(o-hydroxyphenyl)methane
bis(p-propylaminophenyl)(m-bromophenyl)methane
tris(4-amino-o-tolyl)methane
tris(4-anilino-o-tolyl)methane
tris(p-benzylaminophenyl)methane
tris[4-bis(2-cyanoethyl)amino-o-tolyl]methane
tris[p-(2-cyanoethyl)ethylaminophenyl]methane
tris(p-dibutylaminophenyl)methane
tris(p-di-t-butylaminophenyl)methane
tris(p-dimethylaminophenyl)methane
tris(4-diethylamino-2-chlorophenyl)methane
tris(p-diethylaminophenyl)methane
tris(4-diethylamino-o-tolyl)methane
tris(p-dihexylamino-o-tolyl)methane
tris(4-dimethylamino-o-tolyl)methane
tris(p-hexylaminophenyl)methane
tris[p-bis(2-hydroxyethyl)aminophenyl]methane
tris(p-methylaminophenyl)methane
tris(p-dioctadecylaminophenyl)methane b. Aminoxanthenes 3-amino-6-dimethylamino-2-methyl-9-(o-chlorophenyl) xanthene
3-amino-6-dimethylamino-2-methyl-9-phenylxanthene
3-amino-6-dimethylamino-2-methylxanthene
3,6-bis(diethylamino)-9-(o-chlorophenyl)xanthene
3,6-bis(diethylamino)-9-hexylxanthene
3,6-bis(diethylamino)-9-(o-methoxycarbonylphenyl) xanthene
3,6-bis(diethylamino)-9-methylxanthene 3,6-bis(diethylamino)-9-phenylxanthene
3,6-bis(diethylamino)-9-o-tolylxanthene
3,6-bis(dimethylamino)-9-(o-chlorophenyl)xanthene
3,6-bis(dimethylamino)-9-ethylxanthene
3,6-bis(dimethylamino)-9-(o-methoxycarbonylphenyl) xanthene
3,6-bis(dimethylamino)-9-methylxanthene c. Aminothioxanthenes 3,6-bis(diethylamino)-9-(o-ethoxycarbonylphenyl) thioxanthene
3,6-bis(dimethylamino)-9-(o-methoxycarbonylphenyl) thioxanthene
3,6-bis(dimethylamino)thioxanthene
3,6-dianilino-9-(o-ethoxycarbonylphenyl)thioxanthene d. Amino-9,10-dihydroacridines 3,6-bis(benzylamino)-9,10-dihydro-9-methylacridine
3,6-bis(diethylamino)-9-hexyl-9,10-dihydroacridine
3,6-bis(diethylamino)-9,10-dihydro-9-methylacridine
3,6-bis(diethylamino)-9,10-dihydro-9-phenylacridine
3,6-diamino-9-hexyl-9,10-dihydroacridine
3,6-diamino-9,10-dihydro-9-methylacridine
3,6-diamino-9,10-dihydro-9-phenylacridine
3,6-bis(dimethylamino)-9-hexyl-9,10-dihydroacridine
3,6-bis(dimethylamino)-9,10-dihydro-9-methylacridine e. Aminophenoxazines 3,7-bis(diethylamino)phenoxazine
9-dimethylamino-benzo[a]phenoxazine f. Aminophenothiazines 3,7-bis(benzylamino)phenothiazine g. Aminodihydrophenazines 3,7-bis(benzylethylamino)-5,10-dihydro-5-phenylphenazine
3,7-bis(diethylamino)-5-hexyl-5,10-dihydrophenazine
3,7-bis(dihexylamino)-5,10-dihydrophenazine
3,7-bis(dimethylamino)-5-(p-chlorophenyl)-5,10-dihydrophenazine
3,7-diamino-5-(o-chlorophenyl)-5,10-dihydrophenazine
3,7-diamino-5,10-dihydrophenazine
3,7-diamino-5,10-dihydro-5-methylphenazine
3,7-diamino-5-hexyl-5,10-dihydrophenazine
3,7-bis(dimethylamino)-5,10-dihydrophenazine
3,7-bis(dimethylamino)-5,10-dihydro-5-phenylphenazine
3,7-bis(dimethylamino)-5,10-dihydro-5-methylphenazine h. Aminodiphenylmethanes 1,4-bis[bis-p-(diethylaminophenyl)methyl]piperazine
bis(p-diethylaminophenyl)anilinomethane
bis(p-diethylaminophenyl)1-benzotriazolylmethane
bis(p-diethylaminophenyl)-2-benzotriazolylmethane
bis(p-diethylaminophenyl)(p-chloroanilino)methane
bis(p-diethylaminophenyl)(2,4-dichloroanilino)methane
bis(p-diethylaminophenyl)(methylamino)methane
bis(p-diethylaminophenyl)(octadecylamino)methane
bis(p-dimethylaminophenyl)aminomethane
bis(p-dimethylaminophenyl)anilinomethane
1,1-bis(dimethylaminophenyl)ethane
1,1-bis(dimethylaminophenyl)heptane
bis(4-methylamino-m-tolyl)aminoethane i. Leuco indamines 4-amino-4'-dimethylaminodiphenylamine
p-(p-dimethylaminoanilino)phenol j. Aminohydrocinnamic acids (cyanoethanes, leuco methines)

4-amino-α,β-dicyanohydrocinnamic acid, methyl ester
4-anilino-α,β-dicyanohydrocinnamic acid, methyl ester
4-(p-chloroanilino)-α,β-dicyanohydrocinnamic acid, methyl ester
α-cyano-4-dimethylaminohydrocinnamamide α-cyano-4-dimethylaminohydrocinnamic acid, methyl ester
α,β-dicyano-4-diethylaminohydrocinnamic acid, methyl ester
α,β-dicyano-4-dimethylaminohydrocinnamamide
α,β-dicyano-4-dimethylaminohydrocinnamic acid, methyl ester
α,β-dicyano-4-dimethylaminohydrocinnamic acid
α,β-dicyano-4-dimethylaminohydrocinnamic acid, hexyl ester
α,β-dicyano-4-hexylaminohydrocinnamic acid, methyl ester
α,β-[β]-dicyano-4-hexylaminohydrocinnamic acid, methyl ester
α,β-dicyano-4-methylaminocinnamic acid, methyl ester
p-(2,2-dicyanoethyl)-N,N-dimethylaniline
4-methoxy-4'-(1,2,2-tricyanoethyl)azobenzene
4-(1,2,2-tricyanoethyl)azobenzene
p-(1,2,2-tricyanoethyl)-N,N-dimethylaniline k. Hydrazines 1-(p-diethylaminophenyl)-2-(2-pyridyl)hydrazine
1-(p-dimethylaminophenyl)-2(2-pyridyl)hydrazine
1-(3-methyl-2-benzothiazolyl)-2-(4-hydroxy-1-naphthyl) hydrazine
1-(2-naphthyl)-2-phenylhydrazine
1-p-nitrophenyl-2-phenylhydrazine
1-(1,3,3-trimethyl-2-indolinyl)-2-(3-N-phenylcarbamoyl-4-hydroxy-1-naphthyl)hydrazine l. Leuco indigoid dyes m. Amino-2,3-dihydroanthraquinones 1,4-dianilino-2,3-dihydroanthraquinone
1,4-bis(ethylamino)-2,3-dihydroanthraquinone n. Phenethylanilines N-(2-cyanoethyl)-p-phenethylaniline
N,N-diethyl-p-phenylethylaniline
N,N-dimethyl-p-[2-(1-naphthyl)ethyl]aniline 11. Acyl derivatives of leuco dyes which contain a basic NH group—Suitable compounds which have a basic NH group and which form amides when acylated include dihydrophenazines, phenothiazines and phenoxazines. Typical compounds within this class include:

10-acetyl-3,7-bis(dimethylamino)-phenothiazine
10-(p-chlorobenzoyl)-3,7-bis(diethylamino)-phenothiazine
5,10-dihydro-10-(p-nitrobenzoyl)-5-phenyl-3,7-bis-(phenylethylamino)phenazine
10-(p-benzoyl)-3,7-bis(naphthylmethylamino) phenoxazine III. Leucolike compound having no oxidizable hydrogen atom but which are oxidizable to a colored compound—Typical compounds within this class include:

tris(p-dimethylaminophenyl)benzylthiomethane
1-tris(p-diethylaminophenyl)methyl-2-phenylhydrazine
tris(4-diethylamino-o-tolyl)ethoxycarbonylmethane
bis(4-dipropylamino-o-tolyl)(o-fluorophenyl)butoxycarbonylmethane
bis[tris(4-diethylamino-o-tolyl)methyl]-disulfide IV. Organic amines oxidizable to a colored species such as those described in U.S. Pat. Nos. 3,042,515 and 3,042,517. Typical compounds of this type include:

4,4'-ethylenedianiline
diphenylamine
N,N-(dimethylaniline
4,4'-methylenedianiline
triphenylamine
N-vinylcarbazole The photo-oxidizers described herein are inert until struck by actinic radiation such as visible, ultraviolet, infrared, X-ray electron beams, etc. Various photo-oxidizers have different peak sensitivities throughout the spectrum depending on the structure of the compound. As such, the specific photo-oxidizers selected is dependent on the nature of the actinic radiation. When exposed to such radiation, the photo-oxidizer produces an oxidizing agent which oxidizes the color generator to a colored form. Typical photo-oxidizers of this invention have one of the general formulas:

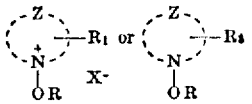

wherein $R_1$ can be any of the following:

a. a methine linkage terminated by a heterocyclic nucleus of the type contained in cyanine dyes, e.g., those set forth in Mees and James, "The Theory of the Photographic Process," Macmillan, 3rd ed., pp. 198–232; the methine linkage can be substituted or unsubstituted, e.g. —CH—, —C($CH_3$)=, —C($C_6H_5$)=,

—CH=CH—,

—CH=CH—CH=, etc.;

b. an alkyl radical preferably containing one to eight carbon atoms including a substituted alkyl radical;

c. an aryl radical including a substituted aryl radical such as a phenyl radical, a naphthyl radical, a tolyl radical, etc.;

d. a hydrogen atom;

e. an acyl radical having the formula

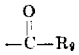

wherein $R_9$ is hydrogen or an alkyl group preferably having one to eight carbon atoms;

f. an anilinovinyl radical such as a radical having the formula

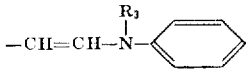

wherein $R_3$ is hydrogen, acyl or alkyl; or g. a styryl radical including substituted styryl radicals, e.g.,

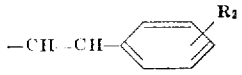

wherein $R_2$ is hydrogen, alkyl, aryl, amino, including dialkylamino such as dimethylamino;

$R_8$ can be either of the following:

a. a methine linkage terminated by a heterocyclic nucleus of the type contained in merocyanine dyes, e.g., those set forth in Mees and James (cited above); the methane linkage can be substituted or unsubstituted; or b. an allylidene radical including a substituted allylidene radical such as a cyanoallylidene radical, an alkylcarboxyallylidene radical or an alkylsulfonylallylidene radical;

R can be either:

a. an alkyl radical preferably having one to eight carbon atoms such as methyl, propyl, ethyl, butyl, etc., including a substituted alkyl radical such as sulfoalkyl, e.g., —$(CH_2)_3SO_3$—, an aralkyl, e.g., benzyl or pyridinatoxyalkyl salt, e.g., —$(CH_2)_3$—O—Y wherein Y is substituted or unsubstituted pyridinium salt; or etc., b. an acyl radical, e.g.,

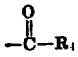

wherein $R_4$ is an alkyl radical preferably having one to eight carbon atoms or aryl radical, e.g., methyl, ethyl, propyl, butyl, phenyl, naphthyl, etc.

Z represents the atoms necessary to complete a five- to six-membered heterocyclic nucleus including a substituted heterocyclic nucleus which nucleus can contain at least one additional heteroatom such as oxygen, sulfur, selenium or nitrogen, e.g., a pyridine nucleus, a quinoline nucleus, etc.; and

[$X^1$] $X^-$ represents an acid anion, e.g., chloride, bromide, iodide, perchlorate, sulfamate, thiocyanate, p-toluenesulfonate, methyl sulfate, tetrafluoroborate, etc.

The preferred photo-oxidizers of the invention have one of the following structures:

(A)

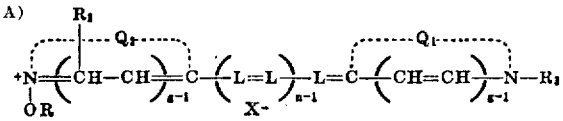

(B)

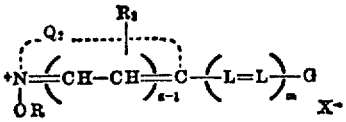

(C)

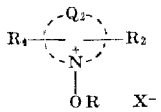

(D)

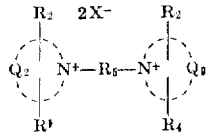

(E)

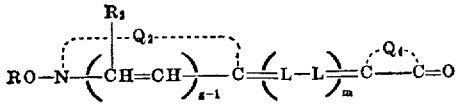

or (F)

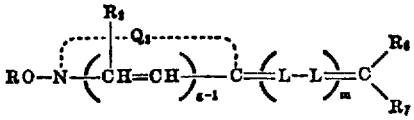

wherein $Q_1$, $Q_2$ and $Q_9$ each represent the nonmetallic atoms necessary to complete a sensitizing or desensitizing nucleus containing five or six atoms in the heterocyclic ring, which nucleus can contain at least one additional heteroatom such as oxygen, sulfur, selenium or nitrogen, i.e., a nucleus of the type used in the production of cyanine dyes, such as the following representative nuclei: a thiazole nucleus, e.g., thiazole, 4-methylthiazole, 3 - ethylthiazole, 4-phenylthiazole, 5-methylthiazole, 5 - phenylthiazole, 4,5-dimethylthiazole, 4,5-diphenylthiazole, 4-(2-thienyl)thiazole, benzothiazole, 4-chlorobenzothiazole, 4- or 5-nitrobenzothiazole, 5-chlorobenzothiazole, 6-chlorobenzothiazole, 7-chlorobenzothiazole, 4 - methylbenzothiazole, 5-methylbenzothiazole, 6 - methylbenzothiazole, 6-nitrobenzothiazole, 5-bromobenzothiazole, 6 - bromobenzothiazole, 5-chloro-6-nitrobenzothiazole, 4 - phenylbenzothiazole, 4-methoxybenzothiazole, 5-methoxybenzothiazole, 6-methoxybenzothiazole, 5 - iodobenzothiazole, 6-iodobenzothiazole, 4 - ethoxybenzothiazole, 5 - ethoxybenzothiazole, a tetrahydrobenzothiazole nucleus, 5,6-dimethoxybenzothiazole, 5,6-methylenedioxybenzothiazole, 5-hydroxybenzothiazole, 6-hydroxybenzothiazole, α-naphthothiazole, β-naphthothiazole, β,β - naphthothiazole, 5-methoxy-β,β-naphthothiazole, 5-ethoxy - β - naphthothiazole, 8-methoxy-α-naphthothiazole, 7 - methoxy-α-naphthothiazole, 4' - methoxythianaphtheno-7',6',4,5-thiazole, nitro group substituted naphthothiazoles, etc.; an oxazole nucleus, e.g., 4-methyloxazole, 4-nitro-oxazole, 5-methyloxazole, 4-phenyloxazole, 4,5-diphenyloxazole, 4 - ethyloxazole, 4,5 - dimethyloxazole, 5 - phenyloxazole, benzoxazole, 5-chlorobenzoxazole, 5 - methylbenzoxazole, 5-phenylbenzoxazole, 5- or 6-nitrobenzoxazole, 5-chloro-6-nitrobenzoxazole, 6 - methylbenzoxazole, 5,6 - dimethylbenzoxazole, 4,6-dimethylbenzoxazole, 5 - methoxybenzoxazole, 5-ethoxybenzoxazole, 5 - chlorobenzoxazole, 6-methoxybenzoxazole, 5-hydroxybenzoxazole, 6 - hydroxybenzoxazole, α - naphthoxazole, β - naphthoxazole, nitro group substituted naphthoxazoles, etc.; a selenazole nucleus, e.g., 4-methylselenazole, 4-nitroselenazole, 4-phenylselenazole, benzoselenazole, 5 - chlorobenzoselenazole, 5-methoxybenzoselenazole, 5 - hydroxybenzoselenazole, 5- or 6-nitrobenzoselenazole, 5-chloro - 6 - nitrobenzoselenazole, tetrahydrobenzoselenazole, α - naphthoselenazole, β-naphthoselenazole, nitro group substituted naphthoselenazoles, etc., a thiazoline nucleus, e.g., thiazoline, 4-methylthiazoline, etc.; a pyridine nucleus, e.g., 2-pyridine, 5-methyl-2-pyridine, 4-pyridine, 3-methyl - 4 - pyridine, nitro group substituted pyridines, etc.; a quinoline nucleus, e.g., 2-quinoline, 3-methyl-2-quinoline, 5-ethyl-2-quinoline, 6 - chloro-2-quinoline, 6-nitro-2-quinoline, 8-chloro-2-quinoline, 6-methoxy-2-quinoline, 8 - ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1-isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3 - dimethyl-5 or 6 - nitroindolenine, 3,3-dimethyl-5- or 6-cyanoindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-alkyl-5-nitrobenzimidazole, 1-aryl-5,6-dichlorobenzimidazole, 1 - alkyl-α-naphthimidazole, 1-aryl-β-naphthimidazole, 1-alkyl-5-methoxy-α-naphthimidazole, or, an imidazo[4,5-b]quinoxaline nucleus, e.g., 1-alkylimidazo[4,5-b]quinoxaline such as 1-ethylimidazo[4,5-b]quinoxaline, 6-chloro - 1 - ethylimidazo[4,5-b]quinoxaline, etc., 1-alkenylimidazo[4,5-b]quinoxaline such as 1-allylimidazo[4,5-b]quinoxaline, 6-chloro-1-allylimidazo[4,5-b]quinoxaline, etc., 1-arylimidazo[4,5-b]quinoxaline, such as 1 - phenylimidazo[4,5-b]quinoxaline, 6 - chloro-1-phenylimidazo[4,5-b]quinoxaline, etc.; a 3,3-dialkyl-3H-pyrrolo-[2,3-b]pyridine nucleus, e.g., 3,3-dimethyl-3H-pyrrolo[2,3-b]pyridine, 3,3 - diethyl - 3H - pyrrolo[2,3-b]pyridine, etc., a thiazolo[4,5-b]quinoline nucleus, and the like. $R_3$ represents an alkyl group, including substituted alkyl (preferably a lower alkyl containing from one to four carbon atoms), e.g., methyl, ethyl, propyl, isopropyl, butyl, hexyl, cyclohexyl, decyl, dodecyl, etc., and substituted alkyl groups (preferably a substituted lower alkyl containing from one to four carbon atoms), such as a hydroxyalkyl group, e.g., β- hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., an alkoxy group, e.g., methoxy, ethoxy, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω - butyryloxybutyl, etc., an alkoxycarbonylalkyl group, e.g., β-methoxycarbonylethyl, ω-ethoxycarbonylbutyl, etc. or an aralkyl group, e.g., benzyl, phenethyl, etc.; an alkenyl group, e.g., allyl, 1-propenyl, 2-butenyl, etc., or an aryl group, e.g., phenyl, tolyl, naphthyl, methoxyphenyl, chlorophenyl, etc.; $Q_4$ represents the nonmetallic atoms required to complete a five to six membered heterocyclic nucleus, typically containing a heteroatom selected from nitrogen, sulfur, selenium, and oxygen, such as a 2-pyrazolin-5-one nucleus (e.g., 3-methyl-1-phenyl-2-pyrazolin-5-one, 1-phenyl-2-pyrazolin - 5 - one, 1-(2-benzothiazolyl)-3-methyl-2-pyrazolin-5-one, etc.); an isoxazolone nucleus (e.g., 3-phenyl-5-(4H)-isoxazolone, 3 - methyl-5-(4H)-isoxazolone, 3-methyl-5-(4H) - isoxazolone, etc.); an oxindole nucleus (e.g., 1-alkyl-2,3-dihydro - 2 - oxindoles, etc.), 2,2,4,6 - triketohexahydropyrimidine nucleus (e.g., barbituric acid or 2-thiobarbituric acid as well as their 1-alkyl (e.g., 1-methyl, 1-ethyl, 1-propyl, 1-heptyl, etc.) or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl), etc.) or 1,3-diaryl (e.g., 1,3-diphenyl, 1,3-di(p-chlorophenyl), 1,3 - di(p - ethoxycarbonylphenyl), etc.) or 1-aryl (e.g., 1-phenyl, 1-p-chlorophenyl, 1-p-ethoxycarbonylphenyl), etc.) or 1 - alkyl-3-aryl (e.g., 1-ethyl-3-phenyl, 1-n-heptyl-3-phenyl, etc.) derivatives), a rhodanine nucleus (i.e., 2 - thio - 2,4 - thiazolidinedione series), such as rhodanine, 3-alkylrhodanines (e.g., 3-ethylrhodanine, 3-allylrhodanine, etc.), 3 - carboxy - alkylrhodanines e.g., 3-(2-carboxyethyl)rhodanine, 3-(4 - carboxybutyl)rhodanine, etc.), 3-sulfoalkyl rhodanines (e.g., 3-(2-sulfoethyl)rhodanine, 3-(3 - sulfopropyl)rhodanine, 3 - (4 - sulfobutyl)rhodanine, etc.), or 3-arylrhodanines (e.g., 3-phenylrhodanine, etc.), etc.; a 2(3H) - imidazo-[1,2-a]pyridone nucleus; a 2-furanone nucleus (e.g., 3-cyano-4-phenyl-2(5H) - furanone); a thiophen-3-one-1,1-dioxide nucleus (e.g., benzo[b]thiophen-3(2H)-one - 1,1-dioxide); a 5,7-dioxo - 6,7 - dihydro-5-thiazolo[3,2-a]pyrimidine nucleus (e.g., 5,7-dioxo-3-phenyl-6,7-dihydro-5-thiazolo[3,2-a]pyrimidine, etc.); a 2-thio-2,4-oxazolidinedione nucleus (i.e., those of the 2 - thio - 2,4(3H,5H)-oxazoledione series) (e.g., 3-ethyl-2-thio-2,4-oxazolidinedione, 3-(2-sulfoethyl)-2-thio-2,4-oxazolidinedione, 3-(4-sulfobutyl)-2-thio - 2,4 - oxazolidinedione, 3-(3-carboxypropyl)-2-thio - 2,4 - oxazolidinedione, etc.); a thianaphthenone nucleus (e.g., 2-(2H)-thianaphthenone, etc.); a 2-thio-2,5-thiazolidinedione nucleus (i.e., the 2-thio - 2,5-(3H,4H)-thiazoledione series) (e.g., 3-ethyl-2-thio - 2,5-thiazolidinedione, etc.); a 2,4 - thiazolidinedione nucleus (e.g., 2,4-thiazolidinedione, 3-ethyl-2,4-thiazolidinedione, 3-phenyl-2,4-thiazolidinedione, 3 - α-naphthyl-2,4-thiazolidinedione, etc.); a thiazolidione nucleus (e.g., 4-thiazolidinone, 3 - ethyl - 4 - thiazolidinone, 3-phenyl-4-thiazolidinone, 3-α-naphthyl-4-thiazolidinone, etc.); a 2 - thiazolin-4-one series e.g., 2-ethylmercapto-2-thiazolin-4-one, 2-alkyl-phenylamino-2-thiazolin-4-one, 2-diphenylamino-2-thiazoline-4-one, etc.); a 2 - imino-4-oxazolidinone (i.e., pseudohydantoin) nucleus; a 2,4-imidazolidinedione (hydantoin) series (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl - 2,4 - imidazolidinedione, 1 - ethyl-3-phenyl-2,4-imidazolidinedione, 1-ethyl-2-α-naphthyl 1,2,4-imidazolidinedione, 1,3-diphenyl-2,4-imidazolidinedione, etc.); a 2 - thio-2,4-imidazolidinedione (i.e., 2-thiohydantoin) nucleus (e.g., 2 - thio-2,4-imidazolidinedione, 3 - ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α-naphthyl - 2 - thio-2,4-imidazolidinedione, 1,3 - diethyl-2-thio-2,4-imidazolidinedione, 1 - ethyl-3-phenyl-2-thio-2,4-imidazolidinedione, 1-ethyl-3-α-naphthyl-2-thio-2,4-imidazolidinedione, 1,3 - diphenyl-2-thio-2,4-imidazolidinedione, etc.; a 2 - imidazolin-5-one nucleus (e.g., 2-propylmercapto-2-imidazolin-5-one, etc.);

n is a positive integer from 1 to 4;

m is a positive integer from 1 to 3;

g is a positive integer from 1 to 2;

$R_6$ and $R_7$ each represent a cyano radical, an ester radical such as ethoxycarbonyl, methoxycarbonyl, etc., or an alkylsulfonyl radical such as ethylsulfonyl, methylsulfonyl, etc.;

L represents a methine linkage having the formula $$-\underset{\underset{T}{|}}{C}=$$

wherein T is hydrogen, lower alkyl of one to four carbon atoms or aryl such as phenyl, e.g., $$-CH=,\ -C(CH_3)=,\ -C(C_6H_5)=,\ \text{etc.,}$$

$R_2$ and $R_4$ each represent a hydrogen atom, an alkyl group (preferably a lower alkyl containing from one to four carbon atoms), e.g., methyl, ethyl, propyl, isopropyl, butyl, decyl, dodecyl, etc., or an aryl group, e.g., phenyl, tolyl, naphthyl, methoxyphenyl, chlorophenyl, nitrophenyl, etc.;

X represents an acid anion, e.g., chloride, bromide, iodide, perchlorate, tetrafluoroborate, sulfamate, thiocyanate, p-toluenesulfonate, methyl sulfate, etc.;

G represents an anilino radical or an aryl radical, e.g., phenyl, naphthyl, dialkylaminophenyl, tolyl, chlorophenyl, nitrophenyl, anilinovinyl, etc.;

$R_5$ is an alkyleneoxy radical having one to eight carbon atoms in the alkylene chain including an alkylenedioxy radical and an arylenebisalkoxy radical e.g., ethyleneoxy, trimethyleneoxy, tetramethyleneoxy, propylideneoxy, ethylenedioxy, phenylenebisethoxy, etc.;

R represents either (1) an alkyl radical including a substituted alkyl (preferably a lower alkyl having one to four carbon atoms) e.g., methyl, ethyl, propyl, isopropyl, butyl, hexyl, cyclohexyl, decyl, dodecyl, aralkyl such as benzyl, sulfoalkyl such as β-sulfoethyl, ω-sulfobutyl, ω-sulfopropyl, or (2) an acyl radical, e.g., $$-\overset{O}{\overset{\|}{C}}-R_9$$

wherein $R_9$ is an alkyl including a substituted alkyl or an aryl radical such as methyl, phenyl, naphthyl, propyl, benzyl, etc.

In the above formulas $Q_2$ preferably completes a pyridine, an indole or a quinoline nucleus.

Typical photo-oxidants included in the scope of this invention are the following:

1. 3-ethyl-1′-methoxyoxa-2′-pyridocarbocyanine perchlorate
2. 1′ - ethoxy - 3 - ethyloxa-2′-pyridocarbocyanine tetrafluoroborate
3. 3′ - ethyl - 1 - methoxy-2-pyridothiacyanine iodide
4. 1-ethoxy-3′-ethyl-2-pyridothiacyanine tetrafluoroborate
5. 1-benzyloxy-3′-ethyl-2-pyridothiacyanine iodide
6. 3′-ethyl-1-methoxy-2-pyridothiacarbocyanine iodide
7. 1-ethoxy-3′-ethyl-2-pyridothiacarbocyanine tetrafluoroborate
8. anhydro - 3′ - ethyl - 1 - (3-sulfopropoxy)-2-pyridothiacarbocyanine hydroxide
9. 1-benzyloxy - 3′ - ethyl-2-pyridothiacarbocyanine perchlorate
10. 3′-ethyl - 1 - methoxy-2-pyridothiacarbocyanine perchlorate
11. 1′-methoxy - 1,3,3 - trimethylindo-2′-pyridocarbocyanine pictrate
12. 3′-ethyl - 1 - methoxy-4′,5′-benzo-2-pyridothiacarbocyanine perchlorate
13. 1 - ethoxy - 3′ - ethyl-4′,5′-benzo-2-pyridothiacarbocyanine tetrafluoroborate
14. 1′ - ethoxy - 3 - ethyloxa-2′-carbocyanine tetrafluoroborate
15. 1′-ethoxy-3-ethylthia-2′-cyanine tetrafluoroborate
16. 1′ - ethoxy - 3 - ethylthia-2′-carbocyanine tetrafluoroborate
17. 1′ - ethoxy - 3 - ethylthia-2′-dicarbocyanine tetrafluoroborate
18. 1 - methoxy - 3′ - methyl-2-pyridothiazolinocarbocyanine perchlorate
19. 3′-ethyl-1-methoxy-4-pyridothiacyanine perchlorate
20. 3′ - ethyl - 1 - methoxy-4-pyridothiacarbocyanine perchlorate
21. 1′ - ethoxy - 3 - ethyl-4,5-benzothia-2′-carbocyanine tetrafluoroborate
22. 2 - β - anilinovinyl-1-methoxypyridinium p-toluenesulfonate
23. 1 - ethyl - 1′ - methoxy-4,5-benzothia-4′-carbocyanine perchlorate
24. 1 - methoxy - 2 - methylpyridinium p-toluenesulfonate
25. 1 - methoxy - 4 - methylpyridinium p-toluenesulfonate
26. anhydro - 2 - methyl-1-(3-sulfopropoxy)pyridinium hydroxide
27. 1-ethoxy-2-methylpyridinium tetrafluoroborate
28. 1-benzyloxy-2-methylpyridinium bromide
29. 1-ethoxy-2-methylquinolinium tetrafluoroborate
30. 1,1′-ethylenedioxybispyridinium dibromide
31. 1,1′-trimethylenedioxybispyridinium dibromide
32. 1,1′ - tetramethylenedioxybis(2-methylpyridinium)dibromide
33. 1,1′ - tetramethylenedioxybis(4-methylpyridinium)dibromide
34. 1,1′-tetramethylenedioxybispyridinium dibromide
35. 1,1′-pentamethylenedioxybispyridinium dibromide
36. 1 - acetoxy - 2 - (4 - dimethylaminostyryl)pyridinium perchlorate
37. 1 - benzoyloxy - 2 - (4-dimethylaminostyryl)pyridinium perchlorate
38. 1,3 - diethyl-5-[(1-methoxy-2(1H)-pyridylidene)ethylidene]-2-thiobarbituric acid
39. 3 - ethyl - 5-[(1-methoxy-2(1H)-pyridylidene)ethylidene]rhodanine
40. 1,3 - diethyl - 5 - [(1-methoxy-2(1H)-pyridylidene) ethylidene]-barbituric acid
41. 2-(3,3-dicyanoalkylidene)-1-methoxy-1,2-dihydropyridine
42. 2 - [(1 - methoxy-2(1H)-pyridylidene)-ethylidene] benzo[b]-thiophen-3(2H)-one-1,1-dioxide
43. 3 - cyano - 5 - [(1-methoxy-2(1H)-pyridylidene)ethylidene]-4-phenyl-2(5H)-furanone
44. N-ethoxy-2-picolinium iodide
45. N-ethoxy-2-picolinium hexafluorophosphate
46. N-methoxy - 2 - anilinovinylpyridinium paratoluenesulfonate Photosenstive elements of this invention can be prepared from the color generators and photo-oxidizers of this invention in the usual manner, i.e., by blending a dispersion or solution of the color generator and photo-oxidizer together with a binder, when necessary or desirable, and coating, impregnating or forming a self-supporting layer from the photosensitive composition.

Binders which may optionally be added to the composition are inert materials that serve to adhere the color generator-photo-oxidizer mixture to a substrate. The binder may also serve to thicken the solution of the composition should this be desirable for specific applications. Representative binders that are suitable for use in the present composition include: styrene-butadiene copolymers; silicone resins; styrene-alkyd resins; silicone-alkyd resins; soya-alkyd resins; poly(vinylchloride); poly(vinylidene chloride); vinylidene chlorideacrylonitrile copolymers; poly(vinyl acetate); vinyl acetatevinyl chloride copolymers; poly(vinyl acetals), such as poly(vinyl butyral); polyacrylic and methacrylic esters, such as poly(methylmethacrylate), poly(n - butylmethacrylate), poly(isobutylmethacrylate), etc.; polystyrene, nitrated polystyrene; polymethylstyrene; isobutylene polymers; polyesters, such as poly-(ethylenealkaryloxyalkylene terephthalate); phenolformaldehyde resins; ketone resins; polyamides; polycarbonates; polythiocarbonates; poly(ethyleneglycol - co - bis - hydroxyethoxyphenyl propane terephthalate); copolymers of vinyl haloarylates and vinyl acetate such as poly(vinyl - m-bromobenzoate-covinylacetate); ethyl cellulose, poly(vinyl alcohol), cellulose acetate, cellulose nitrate, chorinated rubber, gelatin, etc. Methods of making resins of this type have been described in the prior art, for example, styrene-alkyd resins can be prepared according to the method described in U.S. Pat. Nos. 2,361,019 and 2,258,423. Suitable resins of the type contemplated for use are sold under such tradenames as Vitel PE–101, Cymac, Piccopale 100, Saran F–220, Lexan 105 and Lexan 145. Other types of binders which can be used include such materials as paraffin, mineral waxes, etc.

The substrates are materials which bear the light-sensitive, image-forming compositions as a coating or impregnant. These materials include paper ranging from tissue paper to heavy cardboard; films of plastics and polymeric materials such as regenerated cellulose, cellulose acetate, cellulose nitrate, polyester of glycol and terephthalic acid, vinyl polymers and copolymers, polyethylene, polyvinylacetate, polymethyl methacrylate, polystyrene, polyvinylchloride; textile fabrics; glass; wood and metals. Opaque as well as transparent substrates can be used. Substrates in which the photosensitive components are dissolved or which bear the photosensitive components as a coating on the reverse side of the substrate, i.e., on the side away from the radiation source used for image formation, must be transparent not only in the visible region but to any form of radiation employed. The substrates should be inert to the photosensitive materials.

Solvents which are inert toward the color generator, the binder and the photo-oxidizer are usually employed to dissolve these components and thereby mix them together and to provide a fluid medium for a convenient and ready application of the photosensitive composition to substrates. Among the solvents which may be employed in preparing the compositions of this invention are amides such as formamide, N,N-dimethylformamide, N,N - dimethylacetamide, hexanimide, styramide; alcohols such as methanol, ethanol, 1-propanol, 2-propanol, butanol; glycols such as ethyleneglycol, polyethyleneglycol, etc.; ketones such as acetone, 2-butanone, etc.; esters such as ethylacetate, ethylbenzoate, etc.; ethers such as tetrahydrofuran, dioxane, etc.; chlorinated aliphatic hydrocarbons such as methylene chloride, ethylene chloride, etc.; aromatic hydrocarbons such as benzene, toluene, etc.; and other common solvents such as dimethylsulfoxide, o-dichlorobenzene, dicyanocyclobutane, 1-methyl-2-oxohexamethylenimine, and various mixtures of the solvents, transparent not only in the visible region but to any form of radiation employed. The substrates should be inert to the photosensitive materials.

Solvents which are inert toward the color generator, the binder and the photo-oxidizer are usually employed to dissolve these components and thereby mix them together and to provide a fluid medium for a convenient and ready application of the photosensitive composition to substrates. Among the solvents which may be employed in preparing the compositions of this invention are amides such as formamide, N,N-dimethylformamide, N,N-dimethylacetamide, hexanimide, styramide; alcohols such as methanol, ethanol, 1-propanol, 2-propanol, butanol; glycols such as ethyleneglycol, polyethyleneglycol, etc.; ketones such as acetone, 2-butanone, etc.; esters such as ethylacetate, ethylbenzoate, etc., ethers such as tetrahydrofuran, dioxane, etc.; chlorinated aliphatic hydrocarbons such as methylene chloride, ethylene chloride, etc.; aromatic hydrocarbons such as benzene, toluene, etc.; and other common solvents such as dimethylsulfoxide, o-dichlorobenzene, dicyanocyclobutane, 1-methyl-2-oxohexamethylenimine, and various mixtures of the solvents.

In preparing the compositions disclosed herein useful results are obtained when the color generator and photo-oxidizer are mixed in mole ratios within the range from about 10:1 to about 1:10. The preferred ratio range is 2:1 to 1:2. The binder, when used, is employed in an amount varying from about 0.5 part to 10 parts by weight per part of combined weight of color generator and photo-oxidizer. The combined weight of color generator and photo-oxidizer in the composition ranges from about 1 weight percent to about 99 weight. A preferred weight range is from about 2 weight percent to about 60 weight percent.

In preparing the compositions disclosed herein useful results are obtained when the color generator and photo-oxidizer are mixed in mole ratios within the range from about 10:1 to about 1:10. The preferred ratio range is 2:1 to 1:2. The binder, when used, is employed in an amount varying from about 0.5 part to 10 parts by weight per part of combined weight of color generator and photo-oxidizer. The combined weight of color generator and photo-oxidizer in the composition ranges from about 1 weight percent to about 99 weight. A preferred weight range is from about 2 weight percent to about 60 weight percent.

When the compositions are coated, a wet thickness of about 0.001 inch to about 0.01 inch is utilized, the preferred range being from about 0.002 inch to about 0.006 inch. When the composition is impregnated into a support, suitable amounts of color generator and photo-oxidizer range from about 0.01 mg./in.$^2$ to about 5.0 mg./in.$^2$ of each.

In applying the composition to a supporting substrate, the composition can be sprayed, brushed, applied by a roller or immersion coater, flowed over the surface, picked up by immersion, impregnated or spread by other means. Elements thus formed are dried at room temperature, under vacuum or at elevated temperature.

The elements are then exposed to a pattern of actinic radiation and the image is formed directly on the support. The exposure can be by contact printing techniques, by lens projection, by reflex, by bireflex, from an image-bearing original or any other known technique. Fixing is accompilshed merely by destroying residual photo-oxidant by treating it with alkaline or acid depending on the nature of the photo-oxidant or by the use of a reducing agent to destroy the oxidizing agent present in unexposed areas.

The following examples are included for a further understanding of the invention.

EXAMPLE 1

A composition in the form of a dope consisting of the following materials is coated at a wet thickness of 0.003 inch on a paper support.

| | G. |
|---|---|
| Color generator | 0.1 |
| Photo-oxidant | 0.25 |
| Binder[poly(vinyl acetate)] | 2.0 |
| Methylene chloride | 18.0 |

The resultant colorless coating is dried at 40° C. for 30 minutes and exposed for 30 seconds behind a halftone positive with a photofiood lamp. The color generator used, photo-oxidant used, and color of the dye image are set forth in the following table I.

TABLE I

| Color generator | Photo-oxidant | Image color |
|---|---|---|
| Tris(p-dimethyl-aminophenyl)methane | Compound 44 | Blue. |
| Do | Compound 24 | Do. |
| Do | Compound 25 | Do. |
| Do | Compound 29 | Do. |
| Do | Compound 1 | Do. |
| Do | Compound 12 | Do. |
| Do | Compound 18 | Do. |
| Do | Compound 20 | Do. |
| Do | Compound 28 | Do. |
| Do | None | Colorless. |

EXAMPLE 2

Example 1 is repeated except that the light source used is a mercury arc (Filmsort 086). Similar results are obtained.

EXAMPLE 3

A composition in the form of a dope consisting of the following materials is coated at a wet thickness of 0.003 inch on a paper support and dried:

| | G. |
|---|---|
| Color generator | 0.02 |
| Photo-oxidant(N-ethoxy - 2-picolinium hexafluorophosphate | 0.04 |
| Binder [poly(vinylbutyral)] | 2.0 |
| Methylene chloride | 18.0 |

The element containing a colorless coating is exposed in an imagewise manner to radiation from a mercury arc. The color-generator used and the color of the dye image are set forth in the following table II.

TABLE II

| Color Generator: | Image Color |
|---|---|
| Tris(p-dimethylaminophenyl)methane | Blue. |
| Do | Red. |
| p-(2.2-Dicyanoethyl-N,N-dimethylaniline | Yellow. |
| p-(1,2,2 - Tricyanoethyl) - N,N - dimethylaniline | Orange. |
| p-Phenylenediamine | Gray. |
| Tris(4 - diethylamino - (4 - tolyl)methane trihydro chloride | Blue. |

EXAMPLE 4

Example 3 is repeated except that the photo-oxidant employed is N-methoxy-2-anilinovinylpyridinium paratoluenesulfonate. Similar results are obtained. When the photooxidant is omitted, the coating remains colorless.

The invention has been described in detail with particular reference to certain preferred embodiments thereof, but it will be understood that variations and modifications can be effected within the spirit and scope of the invention.

I claim:

[1. A photosensitive element comprising a support containing a composition comprising a. an essentially colorless, oxidizable, nitrogen containing, organic color generator, which when contained in said composition, is stable to oxidation by atmospheric oxygen under normal room and storage conditions but which is oxidizable to a colored material and b. a photo-oxidant containing a heterocyclic nitrogen atom which is substituted by a member selected from the group consisting of an alkoxy group and an acyloxy group, said photo-oxidant being capable of oxidizing said color generator to a colored material when subjected to actinic radiation.]

2. A photosensitive element comprising a support containing a composition comprising a. an essentially colorless, oxidizable, nitrogen-containing, organic color generator, which when contained in said composition, is stable to oxidation by atmospheric oxygen under normal room and storage conditions but which is oxidizable to a colored material and b. a photo-oxidant which is capable of oxidizing said color generator to a colored material when subjected to actinic radiation, said photo-oxidant having a formula selected from the group consisting of:

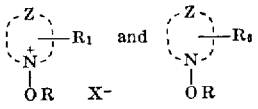

wherein:

$R_1$ is selected from the group consisting of:

a. a methine linkage terminated by a heterocyclic nucleus of the type contained in cyanine dyes,

[b. an alkyl radical,]

*b.* [c.] an anilinovinyl radical,

[d. a hydrogen atom, e. an aryl radical, f. an aldehyde group,] and

*c.* [g.] a styryl radical;

$R_8$ is selected from the group consisting of:

a. a methine linkage terminated by a heterocyclic nucleus of the type contained in merocyanine dyes and b. an allylidene radical *selected from the group consisting of a cyanoallylidene radical, an alkylcarboxyallylidene radical and an alkylsulfonylallylidene radical;*

[R] $R_1$ is selected from the group consisting of:

a. an alkyl radical and b. an acyl radical;

[X] $X^-$ is an acid anion, and,

Z represents the atoms necessary to complete a five- to six-membered heterocyclic nucleus.

[3. The element as defined in claim 2 wherein Z represents the atoms necessary to complete a member selected from the group consisting of a pyridine nucleus and a quinoline nucleus.]

4. The element as defined in claim 2 wherein $R_1$ is a methine linkage terminated by five- to six-membered heterocyclic nucleus.

5. The element as defined in claim 2 wherein said composition contains a polymeric binder for said organic color generator and said photo-oxidant.

6. The element as defined in claim 2 wherein said composition is imbibed into the support.

7. The element as defined in claim 2 wherein said composition is coated on the support.

8. The element as defined in claim 2 wherein said component (a) is selected from the group consisting of (1) a leuco dye; (2) an N-acyl derivative of a leuco dye; (3) a substituted triarylmethane wherein the single remaining methane bond is substituted with benzylthio, 2-phenylhydrazino, alkoxycarbonyl or disulfide; and (4) an organic amine.

9. The element as defined in claim 2 wherein said component (b) is selected from the group consisting of:

(A)

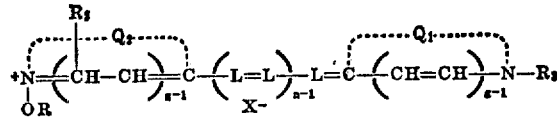

(B)

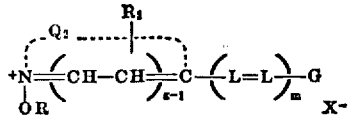

(C)

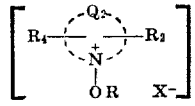

(D)

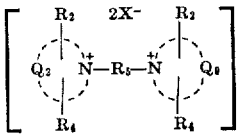

(E) (C)

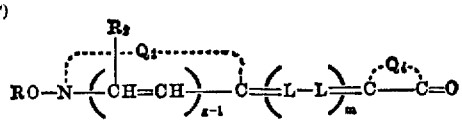

(F) (D)

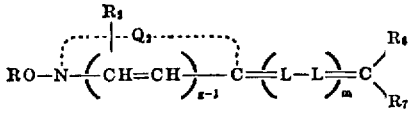

wherein:

$Q_1$, $Q_2$ and $Q_4$ [$Q_9$] each represent the nonmetallic atoms necessary to complete a five- to six-membered heterocyclic nucleus;

n is a positive integer of from 1 to 4;

m is a positive integer of from 1 to 3;

[$R_5$ is an alkyleneoxy radical having one to eight carbon atoms in the alkylene chain;]

g is a positive integer from 1 to 2;

[X'] $X^-$ is an acid anion;

L is a methine linkage;

[R] $R_1$ is selected from the group consisting of an alkyl radical and an acyl radical;

$R_2$ [and $R_4$ are each] *is* selected from the group consisting of an aryl radical, a hydrogen atom and an alkyl radical;

$R_3$ is selected from the group consisting of an alkyl radical, an alkenyl radical, an aryl radical and an alkoxy radical;

G is selected from the group consisting of an anilinovinyl radical and an aryl radical; and $R_6$ and $R_7$ are each a cyano radical.

[10. A photosensitive element comprising a support having coated thereon a composition comprising a. from about 0.1 to about 10 percent by weight of tris-(p-dimethylaminophenyl)methane as a color generator, b. from about 0.1 to about 10 percent by weight of N-ethoxy-2-picolinium iodide as a photo-oxidant, and c. a polymeric binder.]

[11. A photosensitive element comprising a support having coated thereon a composition comprising a. from about 0.1 to about 10 percent by weight of tris-(p-dimethylaminophenyl)methane as a color generator, b. from about 0.1 to about 10 percent by weight of N-ethoxy-2-picolinium hexafluorophosphate as a photo-oxidant and c. a polymeric binder.]

12. A photosensitive element comprising a support having coated thereon a composition comprising a. from about 0.1 to about 10 percent by weight of tris-(p-dimethylaminophenyl)methane as a color generator, b. from about 0.1 to about 10 percent by weight of N-methoxy - 2 - anilinovinylpyridinium paratoluenesulfonate as a photo-oxidant and c. a polymeric binder.

[13. A photosensitive composition comprising a. an essentially colorless, oxidizable, nitrogen containing, organic color generator, which when contained in said composition, is stable to oxidation by atmospheric oxygen under normal room and storage conditions but which is oxidizable to a colored material and b. a photo-oxidant containing a heterocyclic nitrogen atom which is substituted by a member selected from the group consisting of an alkoxy group and an acyloxy group, said photo-oxidant being capable of oxidizing said color generator to a colored material when subjected to actinic radiation.]

14. A photosensitive composition comprising a. an essentially colorless, oxidizable, nitrogen-containing, organic color generator, which when contained in said composition, is stable to oxidation by atmospheric oxygen under normal room and storage conditions but which is oxidizable to a colored material and b. a photo-oxidant which is capable of oxidizing said color generator to a colored material when subjected to actinic radiation, said photo-oxidant having a formula selected from the group consisting of:

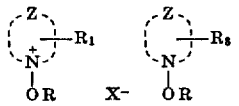

wherein:

[R] $R_1$ is selected from the group consisting of:

a. a methine linkage terminated by a heterocyclic nucleus of the type contained in cyanine dyes,

[b. an alkyl radical,]

*b.* [c.] an anilinovinyl radical,

[d. a hydrogen atom, c. an aryl radical, f. an aldehyde group] and

*c.* [g.] a styryl radical;

$R_8$ is selected from the group consisting of:

a. a methine linkage terminated by a heterocyclic nucleus of the type contained in merocyanine dyes and b. an allylidene radical *selected from the group consisting of a cyanoallylidene radical, an alkylcarboxyallylidene radical and an alkylsulfonylallylidene radical;*

[R] $R_1$ is selected from the group consisting of a. an alkyl radical and b. an acyl radical;

*X* [X] is an acid anion; and,

Z represents the atoms necessary to complete a five- to six-membered heterocyclic nucleus.

15. The photosensitive composition as defined in claim 14 wherein Z represents the atoms necessary to complete a member selected from the group consisting of a pyridine nucleus and a quinoline nucleus.

16. The photosensitive composition as defined in claim 14 wherein $R_1$ is a methine linkage terminated by a five- to six-membered heterocyclic nucleus.

17. The photosensitive composition as defined in claim 14 wherein said composition contains a polymeric binder for said organic color generator and said photo-oxidant.

18. The photosensitive composition as defined in claim 14 wherein said component (a) is selected from the group consisting of (1) a leuco dye; (2) an N-acyl derivative of a leuco dye; (3) a substituted triarylmethane wherein the single remaining methane bond is substituted with benzylthio, 2-phenyl-hydrazino, alkoxycarbonyl or disulfide; and (4) an organic amine.

19. The photosensitive composition as defined in claim 14 wherein said component (b) is selected from the group consisting of (A)

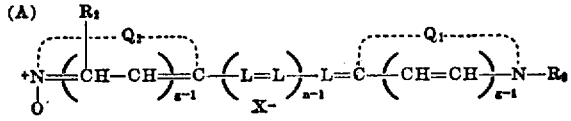

(B)

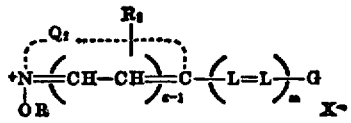

(C)

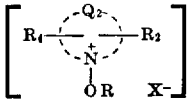

(D)

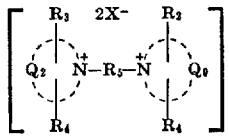

[(E)](*C*)

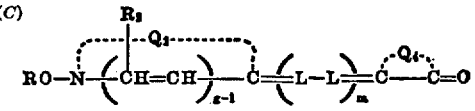

and (F)](*D*)

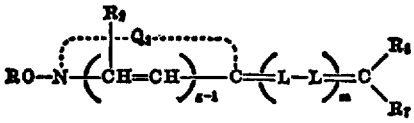

wherein:

$Q_1$, $Q_2$ and $Q_4$ [Q] each represent the nonmetallic atoms necessary to complete a five- to six-membered heterocyclic nucleus;

n is a positive integer from 1 to 4;

m is a positive integer from 1 to 3;

[$R_5$ is an alkyleneoxy radical having one to eight carbon atoms in the alkylene chain;]

g is a positive integer from 1 to 2;

X is an acid anion;

L is a methine linkage;

[R] $R_1$ is selected from the group consisting of an alkyl radical and an acyl radical;

$R_2$ [and $R_4$ are each] *is* selected from the group consisting of an aryl radical, a hydrogen atom and an alkyl radical;

$R_3$ is selected from the group consisting of an alkyl radical, an alkenyl radical, an aryl radical and an alkoxy radical;

G is selected from the group consisting of an aminovinyl radical and an aryl radical; and $R_6$ and $R_7$ are each a cyano radical.

20. A process for producing a visible image comprising the steps of

A. providing a photosensitive element comprising a support containing a composition comprising a. an essentially colorless, oxidizable, nitrogen-containing, organic color generator, which when contained in said composition, is stable to oxidation by atmospheric oxygen under normal room and storage conditions but which is oxidizable to a colored material and b. a photo-oxidant containing a heterocyclic nitrogen atom which is substituted by a member selected from the group consisting of an alkoxy group and an acyloxy group, said photo-oxidant being capable of oxidizing said color generator to a colored material when subjected to actinic radiation, and B. exposing said element to a pattern of actinic radiation.

References Cited

The following references, cited by the Examiner, are of record in the patented file of this patent or the original patent.

UNITED STATES PATENTS

| | | | |
|---|---|---|---|
| 3,042,517 | 7/1962 | Wainer | 96—90 |
| 3,360,370 | 12/1967 | Yembrick | 96—90 |
| 3,383,212 | 5/1968 | MacLachlan | 96—90 |
| 3,390,995 | 7/1968 | Manos | 96—90 |
| 3,390,996 | 7/1968 | MacLachlan | 96—90 X |
| 3,395,018 | 7/1968 | Read | 96—90 |
| 3.418,128 | 12/1968 | Huett | 96—90 |
| 3,445,233 | 5/1969 | Cescon | 96—48 X |
| 3,445,234 | 5/1969 | Cescon | 96—90 |
| 3,481,739 | 12/1969 | Wainer | 96—90 |
| 3,582,342 | 6/1971 | Itano et al. | 96—90 |
| 3,042,515 | 7/1962 | Wainer | 90—90 X |

RONALD H. SMITH, Primary Examiner

W. H. LOUIE, Jr., Assistant Examiner

U.S. Cl. X.R.

96—100; 117—34; 204—158

UNITED STATES PATENT AND TRADEMARK OFFICE

CERTIFICATE OF CORRECTION

PATENT NO. : Re. 28,240

DATED : Reissued November 12, 1974

INVENTOR(S) : Philip W. Jenkins

It is certified that error appears in the above-identified patent and that said Letters Patent are hereby corrected as shown below:

Column 2, line 71, that part of formula reading "(p-dimethylaminophenyl)" should read -- (p-dimethylaminophenyl)- --. Column 3, line 6, that part of formula reading "(p-methoxyphenyl)" should read -- (P-methoxyphenyl)- --; line 20, that part of formula reading "(p-aminophenyl)" should read -- (p-aminophenyl)- --; line 25, "(p-diethylaminophenyl)methane" should be on the preceding line immediately after "methane" and also should read -- p-diethylaminophenyl)methane --; line 26, that part of formula reading "(p-dimethylaminophenyl)" should read -- (p-dimethylaminophenyl)- --; line 28, that part of formula reading "(p-methoxyphenyl)" should read -- (p-methoxyphenyl)- --; line 32, that part of formula reading "(p-diethylaminophenyl)" should read -- (p-diethylaminophenyl)- --; line 38, that part of formula reading "ethylaminophenyl]" should read -- ethylaminophenyl]- --; line 47, that part of formula reading "(p-diethylaminophenyl)" should read -- (p-ethylaminophenyl)- --; line 60, that part of formula reading "naphthyl)" should read -- naphthyl)- --; line 62, that part of formula reading "(p-dimethylaminophenyl)" should read -- (p-dimethylaminophenyl)- --line 64, that part of formula reading "naphthyl)" should read -- naphthyl)- --; line 69, that part of formula reading "(p-diethylaminophenyl)" should read -- (p-diethylaminophenyl)- --line 72, that part of formula reading "(p-diethylaminophenyl)" should read -- (p-diethylaminophenyl)- --; line 74, that part of formula reading "(p-diphenylaminophenyl)" should read -- (p-diphenylaminophenyl)- --. Column 4, line 3, that part of formula reading "naphthyl)" should read -- naphthyl)- --; line

UNITED STATES PATENT AND TRADEMARK OFFICE

CERTIFICATE OF CORRECTION

PATENT NO. :Re. 28,240

DATED :Reissued November 12, 1974

INVENTOR(S) :Philip W. Jenkins

It is certified that error appears in the above-identified patent and that said Letters Patent are hereby corrected as shown below:

5, that part of formula reading "(p-butylaminophenyl)" should read -- (p-butylaminophenyl)- --; line 10, that part of formula reading "(p-diethylaminophenyl)" should read -- (p-diethylaminophenyl)- --; line 14, that part of formula reading "tolyl)" should read -- tolyl)- --; line 16, that part of formula reading "tolyl)" should read -- tolyl)- --; line 18, that part of formula reading "naphthyl)" should read -- naphthyl)- --; line 36, that part of formula reading "(p-dimethylaminophenyl)" should read -- (p-dimethylaminophenyl)- --; line 41, that part of formula reading "(o-chlorophenyl)" should read -- (o-chlorophenyl)- --; line 66, that part of formula reading "(o-chlorophenyl)" should read -- (o-chlorophenyl)- --; line 73, that part of formula reading "(o-methoxycarbonylphenyl)" should read -- (o-methoxycarbonylphenyl)- --. Column 5, line 5, that part of formula reading "(o-methoxycarbonylphenyl) should read -- (o-methoxycarbonylphenyl)- --; line 9, that part of formula reading "(o-ethoxycarbonylphenyl)" should read -- (o-ethoxycarbonylphenyl)- --; line 11, that part of formula reading "(o-methoxycarbonylphenyl)" should read -- (o-methoxycarbonylphenyl)- --; line 52, that part of formula reading "(p-diethylaminophenyl)1" should read --(p-diethylaminophenyl)-1--. Column 6, line 22, that part of formula reading "2(2" should read --2-(2--; line 23, that part of formula reading "naphthyl)" should read -- naphthyl)- --; line 51, that part of formula reading "bis(naphthylmethylamino)" should read -- bis(naphthylmethylamino)- --;

UNITED STATES PATENT AND TRADEMARK OFFICE

CERTIFICATE OF CORRECTION

PATENT NO. : Re. 28,240

DATED : Reissued November 12, 1974

INVENTOR(S) : Philip W. Jenkins

It is certified that error appears in the above-identified patent and that said Letters Patent are hereby corrected as shown below:

line 68, that part of formula reading "(dimethylaniline" should read --dimethylaniline--. Column 7, line 21, "-CH-" should read --=CH= --. Column 8, line 33, that part of formula reading "$R_4$" should read --R4--. Column 9, last line, that part of formula reading "2,2,4,6" should read --2,4,6--. Column 12, line 22, that part of formula reading "pyridylidene)" should read -- pyridylidene)- --; line 26, that part of formula reading "ethylidene]" should read -- ethylidene]- --; line 35, "Photosenstive" should read --Photosensitive--. Column 15, line 38, "by a" should read --by [a--; line 39, "and an" should read --and] an--. Column 16, line 8, "[X]" should read --[$X^1$]--; line 46, the enclosing bracket to the left of the formula should be placed to the left of "(C)"; line 50, the enclosing bracket to the left of the formula should be placed to the left of "(D)"; line 56, "(E)" should read --[(E)] --; line 60, between the two formulas, --and--- should be inserted; line 61, "(F)" should read --[(F)]--. Column 17, line 49, "by a" should read --by [a--; line 50, "and an" should read --and] an--. Column 18, line 3, "c." should read --e.--; line 17, "[X]" should read --[$X^1$]--; line 53, the enclosing bracket to the left of the formula should be placed to the left of "(C)"; line 58, the enclosing bracket to the left of the formula should be placed to the left of "(D)"; line 71, "(F)]" should read --[(F)] --. Column 19, line 9, "X" should read --$X^-$--; line 11, "$R_1$" should be italicized; line 23, "20." should read --[20.--. Column 20, lines 8-9, "radiation." should read --radiation.]--; after

UNITED STATES PATENT AND TRADEMARK OFFICE

CERTIFICATE OF CORRECTION

PATENT NO. :Re. 28,240

DATED :Reissued November 12, 1974

INVENTOR(S) :Philip W. Jenkins

It is certified that error appears in the above-identified patent and that said Letters Patent are hereby corrected as shown below:

line 9, the following should be inserted in italics:
--21. The element as defined in claim 2 wherein Z represents the atoms necessary to complete a member selected from the group consisting of a pyridine nucleus and a quinoline nucleus.--

Signed and Sealed this

Thirty-first Day of August 1976

[SEAL]

*Attest:*

RUTH C. MASON
*Attesting Officer*

C. MARSHALL DANN
*Commissioner of Patents and Trademarks*